Dec. 12, 1950 — J. O. SCHERER — 2,533,964
GELATIN MELTER
Filed July 9, 1949 — 2 Sheets-Sheet 1

INVENTOR.
John Otto Scherer
BY Parker and Burton
ATTORNEY.

Dec. 12, 1950 J. O. SCHERER 2,533,964
GELATIN MELTER
Filed July 9, 1949 2 Sheets-Sheet 2
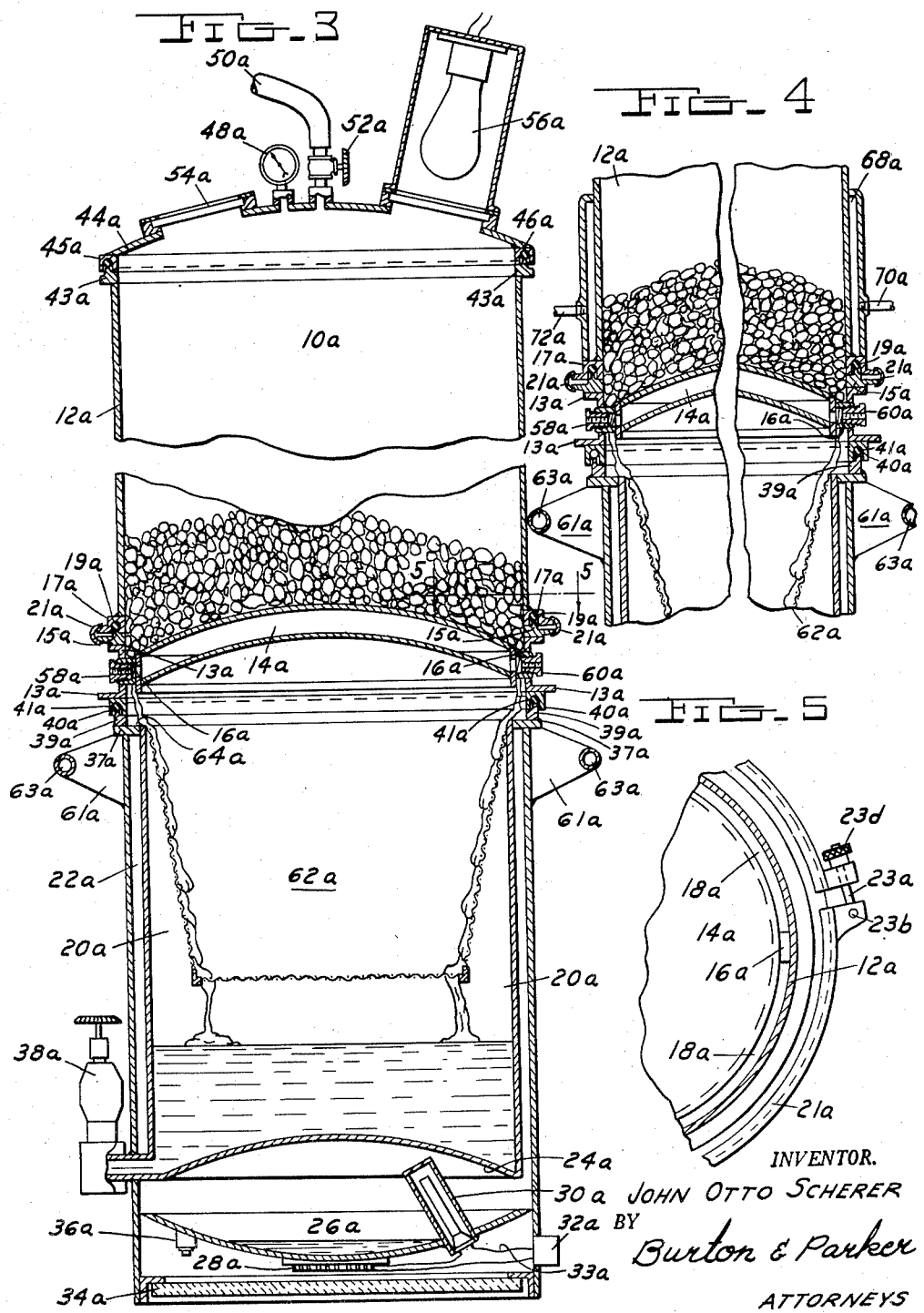
INVENTOR.
JOHN OTTO SCHERER
BY
Burton & Parker
ATTORNEYS Patented Dec. 12, 1950

2,533,964

UNITED STATES PATENT OFFICE 2,533,964

GELATIN MELTER

John Otto Scherer, Detroit, Mich., assignor to R. P. Scherer Corporation, Detroit, Mich., a corporation of Michigan Application July 9, 1949, Serial No. 103,861

3 Claims. (Cl. 23—280)

This invention relates to improvements in apparatus for preparing molten gelatin solutions. This application is a continuation in part of my application, Serial No. 496,817, filed July 30, 1943, now forfeited.

An object is to provide an improved apparatus for preparing a molten gelatin solution of the desired composition and consistency and one which is relatively free from air bubbles.

More particularly the invention relates to the preparation of molten gelatin solutions which are relatively viscous and which are suitable for the casting of bands or ribbons such as are employed in the fabrication of hermetically sealed gelatin capsules and specifically to improvements in apparatus for preparing gelatin solutions through the employment of which the operation of preparing molten gelatin may be carried out with the minimum of possibility of injury to the gelatin.

Heretofore one practice of preparing a molten gelatin solution has been to soak dry gelatin flakes in a mixture of cold water and glycerin of the proportions desired in the finished solution and thereafter to heat the soaked gelatin mass in a double boiler type of heating apparatus until the gelatin was reduced to the molten state. The gelatin was then allowed to stand for the necessary period of time for the air bubbles to pass off which time period might be 24 to 48 hours.

Another practice has been to soak gelatin flakes in a mixture of glycerin and cold water but with the water present in an amount in excess of that required for the finished solution. This produced a more dilute solution than resulted from the process first described and the air bubbles rose more freely from such dilute solution. This mixture was then melted and following the melting it was concentrated under carefully controlled heat and at a subatmospheric pressure, reducing the water content to the desired amount. Careful control of heat was necessary in this process to prevent gelatin deterioration and though the time required was reduced, as compared with the practice first described, the concentration step required considerable time. Careful attention was necessary as a boiling gelatin solution foams quickly and violently.

This invention is designed to overcome the disadvantages exemplified in the two practices hereinabove discussed and to provide apparatus wherein a gelatin solution of the required characteristics may be quickly and economically prepared.

The apparatus disclosed in the drawing is apparatus which has been found suitable for accomplishing the objects of the invention and wherein a smooth molten gelatin solution substantially free from air may be prepared and maintained. The apparatus comprises communicating upper and lower heated gelatin containing compartments. The saturated flake gelatin mass is placed in the upper compartment and the air is withdrawn therefrom under vacuum. The mass is then heated in the upper compartment throughout its bottom area to the molten state and the construction is such that the molten gelatin drains from the upper compartment into the lower compartment as rapidly as it becomes molten and without any pool of molten gelatin being permitted to collect between the heated bottom of the upper compartment and the saturated gelatin mass.

Other objects, advantages and meritorious features will more fully appear from the following description, appended claims and accompanying drawing, wherein:

Figure 3 is a vertical sectional view through a modified form of apparatus.

Figure 4 is a vertical sectional view through a fragment of the apparatus showing a form slightly modified as compared with that shown in Figures 1 and 3.

Figure 5 is a view taken on the line 5—5 of Figure 3.

Figures 1, 2:
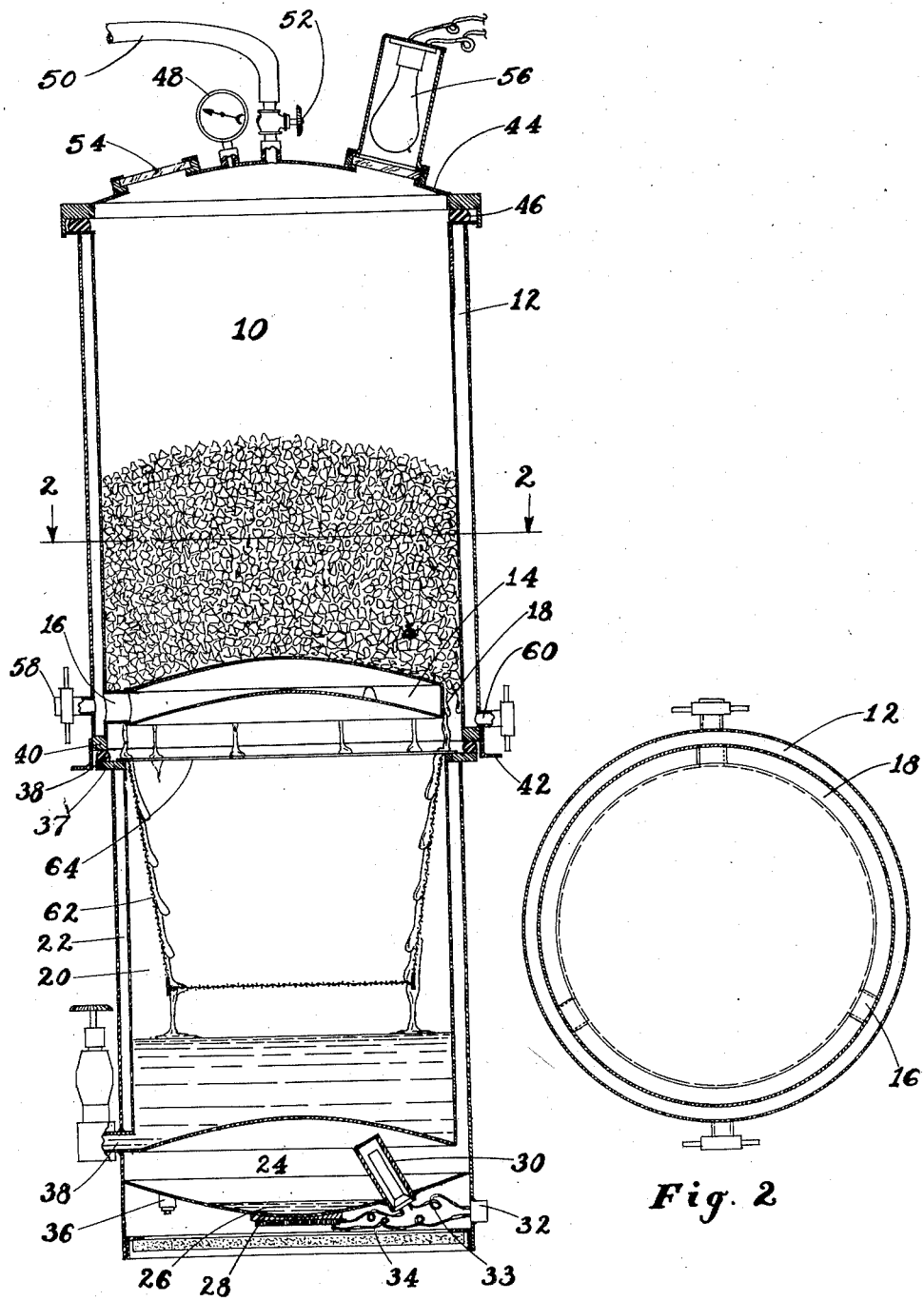
Figure 1 is a vertical section through my improved apparatus.
Figure 2 is a horizontal sectional view taken on the line 2—2 of Figure 1.

The invention is applicable to the preparation of gelatin solutions which may vary from what is known as a hard gelatin to a soft gelatin. A hard gelatin might consist of 42% dry gelatin flakes, 16% glycerin and 42% water. A soft gelatin might consist of 40% gelatin flakes, 30% glycerin and 30% water.

The apparatus shown in Figs. 1 and 2 comprises a container 10, which has a jacketed side wall portion 12, and a jacketed bottom wall portion 14. This vessel is adapted to serve as the gelatin melting vessel. The bottom wall portion is of less diameter than the inside diameter of the side wall portion and such bottom is supported from and communicates with the side wall by means of short tubular sections 16 which bridge the space between the bottom wall and the side wall and establish the fluid communication therebetween. Three of these communicating tubular sections are shown. Due to this spacing between the bottom wall and the side wall there is provided through the bottom wall a series of encircling discharge openings 18 for molten gelatin. The bottom wall is convex upwardly so that as the gelatin melts it flows down through the openings 18 and at no time does there collect a pool of molten gelatin between the bottom 14 and the gelatin mass.

This melting vessel 10 superposes an accumulating vessel 20 which vessel 20 has a jacketed side wall 22 and a jacketed bottom wall 24. The jacketed side wall portion 22 communicates with the hollow bottom portion 24 as shown. These confined spaces 22 and 24 are hermetically sealed and evacuated of air to within about 1/8" to 1/4" mercury column of absolute vacuum. A small quantity of air free distilled water 26 is placed in the hollow bottom of the vessel 20. A conventional electric heater 28 is disposed adjacent to the jacketed bottom of the vessel 20. An electric thermostat is indicated at 30. Connecting electric plug 32, is connected with the heater through the thermostat by lead wires 33. An insulating protective bottom wall 34 is provided as shown. At 36 is a connection whereby the jacketed portion of the vessel 20 may be evacuated of air as hereinabove described and through which the distilled water may be placed therein.

There is indicated at 38 a valve controlled outlet through which molten gelatin may be withdrawn from the vessel 20. A flange ring 37 closes the jacketed side wall space 22 and forms a support for the vessel 10. A gasket 39 is interposed between this ring and the bottom ring 40 of the side wall of the vessel 10. To hold the vessel 10 against displacement upon vessel 20 a flange ring 42 is provided which depends below the vessel 10 and embraces the flange ring 37 of the vessel 20.

Upper vessel 10 is provided with a cover 44 adapted to be received over the open top of the vessel. A suitable gasket 46 is provided to form an air tight seal between such cover and vessel 10. 48 is a vacuum gauge for indicating the pressure within the container and 50 is an air evacuating pipe having a control valve 52. This pipe may be connected with suitable vacuum producing means to withdraw air from the container 10. A glass window 54 is provided to view the operation within the container and 56 indicates a light bulb which may be connected in an electric circuit to illuminate the interior.

A valve controlled steam pipe connection 58 leads into the lower part of the jacketed side wall 12 from one side and a valve controlled outlet pipe connection 60 leads therefrom at the opposite side. Steam may be taken in through the intake connection 58 into the jacketed portion of the vessel 10 and steam condensate may be withdrawn through the outlet pipe 60.

I first mix the dry gelatin flakes with the desired quantity of water, and preferably plus a small excess of water over that desired in the finished solution. This mixing is carried out in a suitable apparatus such as a pony mixer which thoroughly stirs the mass, say from ten to thirty minutes, until the gelatin picks up the liquid and is thoroughly soaked. Gelatin solutions of the character described contain glycerin and my liquid mixture is one of cold water and glycerin. The glycerin is provided in the proportionate amount required for the finished solution and the water is provided in approximately such amount or preferably, as above stated, slightly in excess of that required in the finished solution.

This soaked gelatin mass, with the gelatin in the solid but impregnated state, is then placed in the melting vessel 10. The discharge openings 18 are not large enough to permit the soaked gelatin flakes to fall therethrough. After the soaked gelatin mass has been placed in the vessel 10, the cover 44 is placed thereon and the connection 50 with a suitable conventional vacuum producing system, not shown, is established and the valve 52 is opened so as to permit withdrawal of air from the container. This evacuation of air is preferably carried down to an absolute pressure of from one-half inch to three-quarter inch of mercury and maintained for the necessary amount of time to withdraw substantially all of the air from the gelatin mass. In the practice as presently pursued a time period of about twenty minutes evacuation has been found satisfactory.

Inasmuch as the object is to get substantially all of the air out of the gelatin mass the operation of air withdrawal is continued until a portion even of the water is withdrawn, but not so as to reduce the water content below that required for the finished solution. It is for this reason that a small excess of water is originally provided. Withdrawal of water vapor flushes the air out and dilutes the small amount of air content remaining. As presently practiced about 90% or more of the air is evacuated.

Following this step of evacuating the air from the gelatin mass while maintaining such mass hermetically sealed against atmosphere the valve 52 is closed. Heating steam at 212° F. is then admitted through the valve controlled inlet 58 into the jacketed side wall and bottom portion of the container 10. The gelatin mass in contact with this warm surface will melt and drain down through the openings 18 as rapidly as the same is melted and before it has been heated sufficiently long to injure the gelatin. The construction is such that the circumferential drain outlet 18 provides what might be termed a reverse funnel effect. The surface flow area increases the further the melted gelatin flows from the center of the bottom 14 of vessel 10. The purpose is to permit the molten gelatin to flow away as rapidly as it becomes molten and prevent the formation of a molten gelatin pool subjected to injurious heating. If gelatin is subjected to this heat in the melting pot for a protracted period of time it will break down and lose its Blum or jelly-like strength. Gelatin is a good heat insulator and unless the melted gelatin is withdrawn as it melts the molten gelatin pool which is formed will inhibit the melting of the solid gelatin which superposes the liquid pool.

Disposed within the lower container 20 is an annular tapered flow directing element 62 which is shown in Fig. 1 as removably supported from the upper margin of said vessel. Such element 62 directs the molten gelatin into the vessel 20 without any appreciable splashing thereof. This draining will continue until all the gelatin within the upper vessel has been melted and drained down.

In the meantime the temperature of the lower vessel will be maintained at such a degree by the electric heater 28 as to maintain the gelatin in the molten state without heat injury. The thermostat may be set to maintain a temperature of 120° F. to 135° F. and this will cause the accumulating vessel 20 to maintain the gelatin mass at the required temperature.

When the melting vessel 10 has been emptied, as observed through the viewing window 54, then the steam supplied to the melting vessel may be cut off and the condensate valve in outlet 60 is opened and the air exhaust pipe 50 disconnected from the vacuum system. The melting tank 10 may then be removed from the lower vessel 20. A cover may then be placed over the lower vessel 20 and such accumulating vessel may be kept at the temperature required to maintain the molten solution in the desired state. It is obvious that the melting vessel might be kept in its superposed position if such were desired.

By melting the gelatin in apparatus as above described it is possible to provide a molten solution which is relatively free from air bubbles and which does not require careful attention on the part of the operator during its preparation, which is constantly accumulated as formed, and which is retained at the desired temperature during the accumulation. This process is relatively free from any possibility of damage to the gelatin during the formation of the solution. If the steam is left on too long, no harm is done. Any bubbles which may have water vapor cores will be collapsed by condensation of the water vapor within them when the atmospheric pressure is restored to the gelatin solution in the accumulating vessel.

The constructions illustrated in Figures 3, 4 and 5 are similar to the construction of Figure 1, but differs therefrom in detail. As to the construction of Figure 3, there is a gelatin container 10a having a side wall portion 12a and a jacketed bottom wall portion 14a. This is the gelatin melting vessel and it superposes the gelatin reservoir vessel 20a. This upper container is here shown as formed in two sections, a side wall section and a bottom section. Instead of the bottom portion being integral with the side wall portion as it is in Figure 1, the bottom portion here forms a unit separable from the side wall portion 12a. This bottom unit comprises a jacketed upwardly crowned bottom wall 14a of less diameter than the side wall ring 13a by which it is supported. Such hollow bottom wall 12a is supported spaced from the side wall ring by short tubular connections 16a extending from the interior of the hollow bottom wall 12a through the side wall ring 13a.

In Figure 2, pertaining to the construction of Figure 1, three of these tubular connections are shown and such number could be used in the construction of Figure 3. Due to this spacing between the bottom wall and the side wall there is provided a series of partial circumferential openings 18a for discharge of molten gelatin from the vessel 10a. The bottom wall 14a is convex upwardly so that the gelating flows down continuously through the openings 18a as it melts and at no time does there collect a pool of molten gelatin between the bottom 14a and the gelatin mass within the container. Fluid inlet and outlet pipe connections 58a and 60a, respectively, are threadedly coupled within oppositely disposed tubular connections 16a as shown in Figure 3.

This bottom unit is adapted to be hermetically detachably coupled with the side wall section 12a as shown in Figure 3. The side wall ring 13a is provided with an upwardly projecting ring flange 15a received within the downwardly open channel of the ring flange 17a which ring flange 17a is secured to the bottom of the side wall 12a of the upper container. A sealing gasket 17a is received within this channel ring as shown in Figure 3. This bottom unit is clamped to the side wall unit 12a by a split clamping ring 21a which encircles the same and is clamped there- about by conventional clamping means including a threaded bolt 23a pivotally supported upon one end of the split ring as at 23b and removably receivable within a fork 23c on the opposite end of the ring. The free end of the bolt is provided with an adjustable wing nut 23d. This construction is well known.

This melting vessel 10a with its detachable bottom unit superimposes an accumulating vessel 20a which has a jacketed side wall 22a and a jacketed bottom wall 24a. The jacketed side wall 22a communicates with the hollow bottom portion 24a as shown. These spaces are hermetically sealed and evacuated of air as described in connection with the construction of Figure 1 and a small quantity of water 26a is disposed in the hollow bottom as shown. A conventional electric heater 28a is arranged adjacent to the bottom 24a. An electric thermostat 30a is illustrated. An electric plug 32a is connected with the heater through the thermostat by lead wires 33a. An insulating bottom wall 34a is provided. 36a is a discharge outlet whereby the jacketed portion of the vessel 20a may be evacuated of air and water may be placed therein.

A discharge valve 38a controls an outlet through which molten gelatin may be withdrawn from the vessel 20a. A flange ring 37a closes the top of the jacketed side wall space 22a. This flange ring is surmounted by a perpendicular flange 39a which has a part that is received within the channel section 40a secured to the bottom of the side wall ring 13a of the upper container 10a. Within the channel of this ring section 40a is a compressible gasket 41a which may be formed of suitable compressible gasket material and is adapted to be engaged by the upper portion of the flange 39a when received within the channel as shown in Figure 3. This forms an air-tight seal between the two vessels.

The upper vessel 10a is provided with a cover 44a adapted to be removably received over the open top of the vessel. The side wall 12a of the vessel terminates in a top ring 43a which has an upwardly projecting portion that is received within the downwardly open channel ring 45a of the cover and a suitable compressible gasket 46a is disposed within this channel to be held under compression by the ring 43a as shown in Figure 3 when the cover is seated on the vessel forming an air-tight seal. 48a is a vacuum gage for indicating the pressure within the container and 50a is an air-evacuating pipe having a control valve 52a. This pipe may be connected with suitable vacuum means as hereinabove described. A glass window 54a may be provided and also a light bulb 56a to illuminate the interior of the vessel. A pipe coupling 60a may be threadedly received within the tubular section 16a and this pipe coupling may communicate with a steam pipe for admitting steam therethrough to the interior of the hollow bottom 14a. A steam outlet pipe 58a may be provided for discharging condensed steam from the opposite side.

The lower container 20a is provided with a plurality of radially projecting brackets 61a which brackets carry an encircling ring 63a that may serve as a handle and also as a bumper ring.

The lower vessel may be provided with an annular tapered flow directing element 62a which element has a flange 64a that overhangs the upper margin of the lower vessel as not shown in Figure 3. This is for the purpose of causing the gelatin to flow into the upper and lower vessels without splashing as heretofore described, The construction of Figure 4 is identical with the construction of Figure 3 insofar as the lower vessel is concerned. It differs therefrom only in that the lower portion of the side wall 12a of the upper vessel is jacketed as at 68a. This jacketed portion extends upwardly for only a portion of the height of the side wall. A steam intake pipe 70a and a steam outlet pipe 72a communicates with this jacketed portion 68a of the upper vessel. The steam inlet connection 70a may lead from a different steam source than the intake connection 60a which leads to the hollow bottom wall 14a of the container. Steam at different temperatures may therefore be supplied to the bottom wall and the side wall of this container.

The functioning of the structures of Figures 3 and 4 would be the same as the functioning described heretofore in connection with the structure shown in Figures 1 and 2.

What I claim is:

1. Apparatus for melting gelatin comprising an open top liquid container, means for heating the container, a second container removably superimposed on the first container in fluid tight relationship therewith, said second container having a side wall portion and an upwardly crowned bottom portion, an air-tight closure for said second container, said upwardly crowned bottom portion spaced throughout a portion of its circumference from the side wall portion by an encircling marginal opening through which molten gelatin can flow from the second container into the first container and means for heating the upwardly crowned bottom portion of the second container an inverted truncated conical flow directing element supported within the first container depending from the top thereof below the passageways through the bottom of the second container and extending inwardly and downwardly to a point spaced above the bottom of the first container, and a sealing cover for said second container provided with an opening arranged to submit the interior to vacuum.

2. Apparatus for melting gelatin comprising an open top container having bottom and side walls surrounded by a jacket hermetically sealed thereto so as to provide space for a permanently contained heating medium, a second container superposed thereon, the superposed top and bottom portions of said containers being arranged in fluid-tight relation, said second container having jacketed side and bottom walls, said jacketed bottom wall provided with passageways therethrough adjacent to the side wall of the container, an inverted truncated conical flow directing element supported within the first container depending from the top of the side wall thereof below the passageways through the bottom of the second container to point adjacent to the bottom of the first container, and a sealing cover for said second container provided with an opening arranged to submit the interior to vacuum.

3. Apparatus for melting gelatin comprising an open top container having bottom and side walls surrounded by a jacket hermetically sealed thereto so as to provide space for a permanently contained heating medium, a second container superposed thereon, the superposed top and bottom portions of said containers being arranged in fluid-tight relation, said second container having jacketed side and bottom walls, said jacketed bottom wall of the second container provided with passageways therethrough adjacent the side wall thereof, said bottom wall being upwardly crowned to direct fluid flow thereover toward said passageways, an inverted truncated conical flow directing element supported within the first container depending from the top thereof below the passageways through the bottom of the second container and extending inwardly and downwardly to a point spaced above the bottom of the first container, and a sealing cover for said second container provided with an opening arranged to submit the interior to vacuum.

JOHN OTTO SCHERER.

REFERENCES CITED

The following references are of record in the file of this patent:

UNITED STATES PATENTS

| Number | Name | Date |
|---|---|---|
| 1,993,973 | McNeil | Mar. 12, 1935 |
| 2,130,455 | Cain | Sept. 20, 1938 |
| 2,300,083 | Worthington | Oct. 27, 1942 |